United States Patent
Kohiruimaki et al.

(10) Patent No.: US 9,382,358 B2
(45) Date of Patent: Jul. 5, 2016

(54) METHOD FOR PRODUCING OLEFIN POLYMER

(75) Inventors: Jun Kohiruimaki, Ichihara (JP); Masao Aida, Ichihara (JP); Jun Mase, Ichihara (JP); Kana Minamimoto, Ichihara (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 0 days.

(21) Appl. No.: 14/126,090

(22) PCT Filed: Jun. 28, 2012

(86) PCT No.: PCT/JP2012/004208
§ 371 (c)(1),
(2), (4) Date: Dec. 13, 2013

(87) PCT Pub. No.: WO2013/008401
PCT Pub. Date: Jan. 17, 2013

(65) Prior Publication Data
US 2014/0135461 A1     May 15, 2014

(30) Foreign Application Priority Data
Jul. 13, 2011   (JP)  ................. 2011-154778

(51) Int. Cl.
    *C08F 6/02*          (2006.01)
    *C08F 10/14*        (2006.01)
    *C08F 210/14*      (2006.01)
    *C08F 4/6592*      (2006.01)
    *C08F 6/00*          (2006.01)
    *C08F 4/659*        (2006.01)

(52) U.S. Cl.
CPC ............... *C08F 210/14* (2013.01); *C08F 6/008* (2013.01); *C08F 6/02* (2013.01); *C08F 10/14* (2013.01); *C08F 4/65908* (2013.01); *C08F 4/65912* (2013.01); *C08F 4/65927* (2013.01)

(58) Field of Classification Search
CPC ........ C08F 6/02; C08F 10/14; C08F 4/65927; C08F 4/65912; C08F 210/14
See application file for complete search history.

(56) References Cited

U.S. PATENT DOCUMENTS

| 2008/0020928 A1 | 1/2008 | Wu et al. |
| 2012/0322704 A1* | 12/2012 | Tamoto ................ C10M 111/04 508/421 |
| 2013/0296518 A1 | 11/2013 | Sato et al. |

FOREIGN PATENT DOCUMENTS

| EP | 1 754 694 A1 | 2/2007 |
| JP | 2008-231261 | 10/2008 |
| JP | 2009-504577 | 2/2009 |
| JP | 2009-543927 | 12/2009 |

OTHER PUBLICATIONS

U.S. Appl. No. 14/124,933, filed Dec. 9, 2013, Kohiruimaki, et al.
International Preliminary Report on Patentability and Written Opinion issued Jan. 23, 2014 in Application No. PCT/JP2012/004208.
International Search Report issued Oct. 2, 2012 in Application No. PCT/JP2012/004208.

* cited by examiner

*Primary Examiner* — Caixia Lu
(74) *Attorney, Agent, or Firm* — Oblon, McClelland, Maier & Neustadt, L.L.P (57) ABSTRACT

A method for producing an olefin polymer including: polymerizing one or more α-olefins each having 6 to 20 carbon atoms in the presence of a metallocene catalyst to obtain an olefin polymer; deactivating and decalcifying the catalyst to obtain a decalcified polymerization reaction liquid; mixing the decalcified polymerization reaction liquid containing the olefin polymer with water; and washing the liquid with stirring at a stirring intensity of 0.1 kW/m$^3$ or more for 1 minute or longer.

7 Claims, 2 Drawing Sheets

METHOD FOR PRODUCING OLEFIN POLYMER

TECHNICAL FIELD

The invention relates to a method for producing an olefin polymer and an olefin polymer obtained by this method.

BACKGROUND ART

An olefin polymer is manufactured in recent years using a metallocene-based catalyst, and used as a wax component or a lubricating oil component. In the production of an olefin polymer, in order to deactivate a catalyst after the completion of a polymerization reaction or in order to remove metal components derived from a polymerization reaction catalyst, in general, an aqueous alkaline solution such as sodium hydroxide and a polymerization reaction liquid are mixed (liquid-liquid mixture), whereby metal components are extracted in an aqueous alkaline phase. When a product is manufactured without removing the metal component in the polymerization reaction liquid, the product normally contains metal components in an amount of several tens to several hundreds wtppm. These metal components may exert adverse effects when the olefin polymer is used as a lubricating oil component.

In the Patent Document 1, in order to prevent an excessive polymerization reaction, an active proton-containing oxygen compound is added after the completion of the polymerization. Since no filtration is conducted thereafter, in Examples, aluminum or sodium remains in an amount of 1 wtppm or more.

A method is generally conducted in which a catalyst residue is absorbed by bringing a crude product obtained after polymerization into contact with a solid adsorbent (alumina, acid clay, celite, or the like), followed by filtration. However, in this method, metal components cannot be removed sufficiently.

RELATED ART DOCUMENTS

Patent Documents

Patent Document 1: JP-A-2008-231261

SUMMARY OF THE INVENTION

An object of the invention is to provide a method for producing an olefin polymer which can early and efficiently suppress mixing of metal components derived from a catalyst in a polymer.

The invention provides the following method for producing an olefin polymer and the like.

1. A method for producing an olefin polymer comprising:
   polymerizing one or more α-olefins each having 6 to 20 carbon atoms in the presence of a metallocene catalyst to obtain an olefin polymer;
   deactivating and decalcifying the catalyst to obtain a decalcified polymerization reaction liquid;
   mixing the decalcified polymerization reaction liquid containing the olefin polymer with water; and
   washing the liquid with stirring at a stirring intensity of 0.1 kW/m$^3$ or more for 1 minute or longer.
2. The method for producing an olefin polymer according to 1, wherein a continuous flow stirring chamber is used for the mixing with water.
3. An olefin polymer obtained by the method for producing an olefin polymer according to 1 or 2.

According to the invention, it is possible to provide a method for producing an olefin polymer which can easily and efficiently suppress mixing of metal components derived from a catalyst in a polymer.

MODE FOR CARRYING OUT THE INVENTION

In the method for producing an olefin polymer of the invention, in the presence of a metallocene catalyst, one or more (one, two or three, for example) α-olefins having 6 to 20 carbon atoms are polymerized to produce an olefin polymer, followed by deactivation of a catalyst, and the thus deactivated catalyst is removed from a reaction liquid containing an olefin polymer (decalcification). Thereafter, the thus decalcified polymerization reaction liquid is mixed with water, followed by stirring at a stirring intensity of 0.1 kW/m$^3$ or more for 1 minute or more, whereby a polymerization reaction liquid is washed.

Normally, a deactivator is mixed with a polymerization reaction liquid as an aqueous solution. After stirring, a phase formed mainly of a polymerization liquid that contains a polymer (oil phase) and a phase that contains a deactivator (aqueous phase) are separated, and as a result, a catalyst contained in the polymerization reaction liquid is moved to the aqueous phase and deactivated. The oil phase is collected separately from the aqueous phase, whereby an oil phase from which a significant amount of the catalyst (metal component) has been removed (decalcified polymerization reaction liquid) is obtained. When mixing and stirring the deactivator and the polymerization reaction liquid, solids (precipitate) derived from the catalyst (metal component) are generated which are neither dissolved in the oil phase nor water phase. Most of there solids are mixed with oil and water, and then turn into a layer which is heaver than the oil phase and lighter than the aqueous phase. The solids are then accumulated at the interface of oil and water (intermediate phase). Other parts of the solids (precipitates) float in the oil phase as fine particles of several micrometers in diameter. If the fine particles floating in the oil phase remain in a product, the performance as lubricating oil may be deteriorated remarkably.

In the invention, a decalcified oil phase and water are mixed, and stirred at a stirring intensity of 0.1 kW/m$^3$ or more for 1 minute or longer to wash the oil phase, whereby the amount of fine particles in the oil phase can be decreased. Specifically, by transferring the fine particles from the oil phase to the aqueous phase and removing the aqueous phase, the amount of the fine particles in the oil phase is decreased.

Moreover, since the load imposed on a filter used to remove the fine particles in the oil phase is decreased, the service life of the filter can be prolonged and the cost can be reduced, whereby a highly productive process can be established.

The α-olefin having 6 to 20 carbon atoms used in the polymerization is preferably an α-olefin having 6 to 14 carbon atoms, more preferably α-olefin having 8 to 12 carbon atoms. 1-decene, 1-octene and 1-dedecene are further prefer- able. The polymer of the invention is normally dimer to 200-mer, with tetramer to 200-mer being preferable.

In the polymerization process of the invention, (A) a metallocene compound as the polymerization catalyst, and, in addition to the metallocene compound, (B) an organic aluminumoxy compound (b–1), an ionic compound (b-2) which can be converted to a cation by reacting with the above-mentioned methallocene compound or (C) an aluminum compound or the like can be used. The metallocene compound and other polymerization catalysts are referred to as the "polymerization catalyst".

As the metallocene compound, one represented by the following general formulas (I) to (IV) can be used.

(I)

wherein $M^1$ is titanium, zirconium or hafnium, $C^1$ and $C^2$ are independently a cyclopentadienyl group, an indenyl groups or an alkyl-substituted body thereof, and $C^1$ and $C^2$ may be the same or different from each other; $X^1$ and $X^2$ are independently σ-binding ligand or a chelate ligand, and $X^1$ and $X^2$ may be the same or different; $Y^1$ and $Y^2$ are independently a Lewis base; $Y^1$ and $Y^2$ may be the same or different; and a and b are independently 0 or 1.

(II)

wherein $M^2$ is titanium, zirconium or hafnium; $C^3$ and $C^4$ are independently a cyclopentadienyl group or an indenyl group or an alkyl-substituted body thereof, and $C^3$ and $C^4$ may be the same or different from each other; $X^3$ and $X^4$ are independently σ-binding ligand or a chelate ligand, and $X^3$ and $X^4$ may be the same or different; $Y^3$ and $Y^4$ are a Lewis base; c and d independently are 0 or 1, and $Y^3$ and $Y^4$ may be the same or different; A is a cross-linking group and indicates —$R_2C$— or —$R_2Si$—, and R are independently a hydrogen atom or a hydrocarbon group.

(III)

wherein $R^1$ to $R^6$ are independently a hydrogen atom, a halogen atom, a hydrocarbon group having 1 to 20, preferably 1 to 10, more preferably 1 to 4 carbon atoms (alkyl group, for example) or an organic group having 1 to 20 carbon atoms which contains one or more atoms selected from a halogen atom, a silicon atom, an oxygen atom, a sulfur atom, a nitrogen atom and a phosphor atom; at least one selected from $R^1$ to $R^3$ is a hydrogen atom, and at least one selected from $R^4$ to $R^6$ is a hydrogen atom; $R^a$ and $R^b$ are independently a bonding group represented by the following formula (a); $X^1$ and $X^2$ are independently a hydrogen atom, a halogen atom, a hydrocarbon group having 1 to 20 carbon atoms or an organic group having 1 to 20 carbon atoms containing one or more atoms selected from, a halogen atom, a silicon atom, an oxygen atom, a sulfur atom, a nitrogen atom and a phosphor atom; and M is a transitional metal belonging to the $4^{th}$ to $6^{th}$ group of the periodic table.

(a)

wherein n is an integer of 1 to 3; $R^7$ and $R^8$ are independently a hydrogen atom, a halogen atom, a hydrocarbon group having 1 to 20 carbon atoms or a halogen-containing hydrocarbon group having 1 to 20 carbon atoms, preferably a hydrogen atom or a hydrocarbon group having 1 to 4 carbon atoms, more preferably a hydrogen atom or an alkyl group having 1 to 4 carbon atoms; and B is an atom belonging to the $14^{th}$ group of the periodic table.

As preferable examples of $R^a$ and $R^b$, —$CR^7R^8$—, —$SiR^7R^8$—, —$CR^7R^8$—$CR^7R^{8-}$, and —$SiR^7R^8$—$SiR^7R^8$— can be given.

(IV)

wherein $R^9$ to $R^{18}$ and $X^1$ and $X^2$ are independently a hydrogen atom, a halogen atom, a hydrocarbon group having 1 to 20, preferably 1 to 10, more preferably 1 to 4 carbon atoms (alkyl group, for example), a halogen-containing hydrocarbon group having 1 to 20 carbon atoms, a silicon-containing group, an oxygen-containing group, a sulfur-containing group, a nitrogen-containing group or a phosphor-containing group, and they may combine with adjacent groups to form a ring; $R^c$ and $R^d$ are independently a divalent group having two ligands and indicate a divalent hydrocarbon group having 1 to 20, preferably 1 to 10, more preferably 1 to 4 carbon atoms, a halogen-containing hydrocarbon group having 1 to 20 carbon atoms, a divalent silicon-containing group, a divalent germanium-containing group, a divalent tin-containing group, —O—, —CO—, —S—, —$SO_2$—, —$NR^{19}$—, —$PR^{19}$—, —$P(O)R^{19-}$, —$BR^{19}$— or —$AlR^{19-}$; $R^{19}$ is a hydrogen atom, a halogen atoms, a hydrocarbon group having 1 to 20 carbon atoms or a halogen-containing hydrocarbon group having 1 to 20 carbon atoms; and M is a transitional metal belonging to the $4^{th}$ to $6^{th}$ group of the periodic table.

Specific examples of the metallocene compound represented by the formula (I) include bis(cyclopentadienyl)zirconium dichloride, bis(methylcyclopentadienyl)zirconium dichloride, bis(ethylcyclopentadienyl)zirconium dichloride, bis(isopropylcyclopentadienyl)zirconium dichloride, bis(n-propylcyclopentadienyl)zirconium dichloride, bis(n-butyl-cyclopentadienyl)zirconium dichloride, bis(t-butylcyclopentadienyl)zirconium dichloride, bis(hexylcyclopentadienyl)zirconium dichloride, bis(trimethylsilylcyclopentadienyl)

zirconium dichloride, bis(trimethylsilylmethylcyclopentadienyl)zirconium dichloride, bis(cyclopentadienyl)zirconium chlorohydride, bis(cyclopentadienyl)methylzirconium chloride, bis(cyclopentadienyl)ethylzirconium chloride, bis(cyclopentadienyl) methoxyzirconium chloride, bis(cyclopentadienyl)phenylzirconium chloride, bis(cyclopentadienyl) dimethylzirconium, bis(cyclopentadienyl) diphenylzirconium, bis(cyclopentadienyl) dineopentylzirconium, bis(cyclopentadienyl) dihydrozirconium and bis(cyclopentadienyl) dimethoxyzirconium. Further, those obtained by replacing the chlorine atom in the above-mentioned compounds by a bromine atom, an iodine atom, a hydrogen atom, a methyl group, a phenyl group or the like can be given. In addition, those obtained by replacing zirconium as the central metal in the above-mentioned compounds by titanium or hafnium can be given.

Specific examples of the metallocene compounds represented by the general formula (II) include ethylene-bis(cyclopentadienyl)hafnium dichloride, ethylene-bis(cyclopentadienyl)zirconium dichloride, methylene-bis(cyclopentadienyl)hafnium dichloride, methylene-bis(cyclopentadienyl)zirconium dichloride, isopropylidene-bis(cyclopentadienyl)hafnium dichloride, isopropylidene-bis(cyclopentadienyl)zirconium dichloride, dimethylsilylene-bis(cyclopentadienyl) hafnium dichloride and dimethylsilylene-bis(cyclopentadienyl)zirconium dichloride.

Specific examples of the metallocene compound represented by the general formula (III) include a dichloro compounds such as (1,1'-ethylene)(2,2'-ethylene)biscyclopentadienylzirconium dichloride, (1,1'-ethylene)(2,2'-ethylene)bis(3-methylcyclopentadienyl)zirconium dichloride, (1,1'-ethylene)(2,2'-ethylene)bis(4-methylcyclopentadienyl)zirconium dichloride, (1,1'-ethylene)(2,2'-ethylene)bis(3,4-dimethylcyclopentadienyl)zirconium dichloride, (1,1'-ethylene)(2,2'-ethylene)bis(3,5-dimethylcyclopentadienyl)zirconium dichloride, (1,1'-dimethylsilylene)(2,2'-dimethylsilylene)biscyclopentadienylzirconium dichloride, (1,1'-dimethylsilylene)(2,2'-dimethylsilylene)bis(3-methylcyclopentadienyl)zirconium dichloride, (1,1'-dimethylsilylene)(2,2'-dimethylsilylene)bis(4-methylcyclopentadienyl)zirconium dichloride, (1,1'-dimethylsilylene)(2,2'-dimethylsilylene)bis(3,4-dimethylcyclopentadienyl) zirconium dichloride, (1,1'-dimethylsilylene)(2,2'-dimethylsilylene) bis(3,5-dimethylcyclopentadienyl) zirconium dichloride, (1,1'-dimethylsilylene)(2,2'-ethylene)biscyclopentadienylzirconium dichloride, (1,1'-dimethylsilylene)(2,2'-ethylene)bis(3-methylcyclopentadienyl)zirconium dichloride, (1,1'-dimethylsilylene)(2,2'-ethylene)bis(4-methylcyclopentadienyl)zirconium dichloride, (1,1'-dimethylsilylene)(2,2'-ethylene)bis(3,4-dimethylcyclopentadienyl)zirconium dichloride, (1,1'-dimethylsilylene)(2,2'-ethylene)bis(3,5-dimethylcyclopentadienyl)zirconium dichloride, (1,1'-isopropylidene)(2,2'-dimethylsilylene)biscyclopentadienylzirconium dichloride, (1,1'-isopropylidene)(2,2'-dimethylsilylene)bis(3-methylcyclopentadienyl)zirconium dichloride, (1,1'-isopropylidene)(2,2'-dimethylsilylene)bis(4-methylcyclopentadienyl)zirconium dichloride, (1,1'-isopropylidene)(2,2'-dimethylsilylene)bis(3,4-dimethylcyclopentadienyl)zirconium chloride, (1,1'-isopropylidene)(2,2'-dimethylsilylene)bis(3,5-dimethylcyclopentadienyl)zirconium dichloride, (1,1'-isopropylidene)(2,2'-isopropylidene)bis(3-methylcyclopentadienyl)zirconium dichloride, (1,1'-isopropylidene)(2,2'-isopropylidene)bis(4-methylcyclopentadienyl)zirconium dichloride, (1,1'-isopropylidene)(2,2'-isopropylidene)bis(3,4-dimethylcyclopentadienyl)zirconium dichloride, and (1,1'-isopropylidene)bis(2,2'-isopropylidene)bis(3,5-dimethylcyclopentadienyl)zirconium dichloride, and a dimethyl compound, a diethyl compound, a dihydro compound, a diphenyl compound and a dibenzyl compound thereof, as well as a titanium complex and a hafnium complex thereof.

As the compound represented by the general formula (IV), a dichloro compound such as (1,1'-ethylene)(2,2'-ethylene)bisindenylzirconium dichloride, (1,1'-ethylene)(2,2'-ethylene)bis(3-methylindenyl)zirconium dichloride, (1,1'-ethylene)(2,2'-ethylene)bis(4-methylindenyl)zirconium dichloride, (1,1'-ethylene)(2,2'-ethylene)bis(5-methylindenyl)zirconium dichloride, (1,1'-ethylene)(2,2'-ethylene)bis(5,6-benzoindenyl)zirconium dichloride, (1,1'-ethylene)(2,2'-ethylene)bis(4,5-benzoindenyl)zirconium dichloride, (1,1'-ethylene)(2,2'-ethylene)bis(5,6-dimethylindenyl)zirconium dichloride, (1,1'-dimethylsilylene)(2,2'-dimethylsilylene)bisindenylzirconium dichloride, (1,1'-dimethylsilylene)(2,2'-dimethylsilylene)bis(3-methylindenyl)zirconium dichloride, (1,1'-dimethylsilylene)(2,2'-dimethylsilylene)bis(4-methylindenyl)zirconium dichloride, (1,1'-dimethylsilylene)(2,2'-dimethylsilylene)bis(5-methylindenyl)zirconium dichloride, (1,1'-dimethylsilylene)(2,2'-dimethylsilylene)bis(5,6-benzoindenyl)zirconium dichloride, (1,1'-dimethylsilylene)(2,2'-dimethylsilylene)bis(4,5-benzoindenyl)zirconium dichloride, (1,1'-dimethylsilylene)(2,2'-dimethylsilylene)bis(5,6-dimethylindenyl)zirconium dichloride, (1,1'-dimethylsilylene)(2,2'-ethylene)bisindenylzirconium dichloride, (1,1-dimethylsilylene)(2,2'-ethylene)bis(3-methylindenyl)zirconium dichloride, (1,1'-dimethylsilylene)(2,2'-ethylene)bis(4-methylindenyl)zirconium dichloride, (1,1'-dimethylsilylene)(2,2'-ethylene)bis(5-methylindenyl)zirconium dichloride, (1,1'-dimethylsilylene)(2,2'-ethylene)bis(5,6-benzoindenyl)zirconium dichloride, (1,1'-dimethylsilylene)(2,2'-ethylene)bis(4,5-benzoindenyl) zirconium dichloride, (1,1'-dimethylsilylene)(2,2'-ethylene)bis(5,6-dimethylindenyl)zirconium dichloride, (1,1'-ethylene)(2,2'-dimethylsilylene)bisindenylzirconium dichloride, (1,1'-ethylene)(2,2'-dimethylsilylene)bis(3-methylindenyl)zirconium dichloride, (1,1'-ethylene)(2,2'-dimethylsilylene)bis(4-methylindenyl)zirconium dichloride, (1,1'-ethylene)(2,2'-dimethylsilylene)bis(5-methylindenyl)zirconium dichloride, (1,1'-ethylene)(2,2'-dimethylsilylene)bis(5,6-benzoindenyl)zirconium chloride, (1,1'-ethylene)(2,2'-dimethylsilylene)bis(4,5-benzoindenyl)zirconium dichloride, (1,1'-ethylene)(2,2'-dimethylsilylene)bis(5,6-dimethylindenyl)zirconium dichloride, (1,1'-dimethylsilylene)(2,2'-isopropylidene)bisindenylzirconium dichloride, (1,1'-dimethylsilylene)(2,2'-isopropylidene)bis(3-methylindenyl)zirconium dichloride, (1,1'-dimethylsilylene)(2,2'-isopropylidene)bis(4-methylindenyl)zirconium dichloride, (1,1'-dimethylsilylene)(2,2'-isopropylidene)bis(5-methylindenyl)zirconium dichloride, (1,1'-dimethylsilylene)(2,2'-isopropylidene)bis(5,6-benzoindenyl)zirconium dichloride, (1,1'-dimethylsilylene)(2,2'-isopropylidene)bis(4,5-benzoindenyl)zirconium dichloride, and (1,1'-dimethylsilylene)(2,2'-isopropylidene)bis(5,6-dimethylindenyl)zirconium dichloride, and a dimethyl compound, a diethyl compound, a dihydro compound, a diphenyl compound, a dibenzyl compound thereof, as well as a titanium complex and a hafnium complex thereof can be given, for example.

The metallocene compound used as the component (A) may be used singly or in combination of two or more.

As the organic aluminiumoxy compound (b-1), a chain-like aluminoxane represented by the following general formula (V) and a cyclic aluminoxane represented by the following general formula (VI) can be given.

In the general formulas (V) and (VI), $R^{20}$ to $R^{25}$ are independently a hydrocarbon group having 1 to 20, preferably 1 to 12 carbon atoms or a halogen atom. As the hydrocarbon group, an alkyl group, an alkenyl group, an aryl group, an arylalkyl group or the like can be given. n indicates a polymerization degree, and is normally an integer of 2 to 50, preferably 2 to 40. $R^{20}$ to $R^{25}$ may be the same or different.

Specific examples of the aluminoxane include methylaluminoxane, ethylaluminoxane and isobutylaluminoxane.

As the method for producing the aluminoxane, a method in which alkyl aluminum is brought into contact with a condensation agent such as water can be given. No specific restrictions are made on this technique, and the reaction may be conducted by a known method. For example, a method in which an organic aluminum compound is dissolved in an organic solvent, and the solution is then brought into contact with water; a method in which an organic aluminum compound is added initially at the time of polymerization, followed by addition of water; a method in which crystallization water contained in metal salts or the like or water adsorbed to an inorganic substance or an organic substance is reacted with an organic aluminum compound; a method in which tetraalkyldialkyldialuminoxane is reacted with trialkylaluminium, followed by reaction with water or the like can be given. The aluminoxane may be one which is insoluble in toluene. These alumioxanes may be used singly or in combination of two or more.

As the component (b-2), any can be used as long as it is an inonic compound which is reacted with the metallocene compound as the component (A) to convert it into a cation. As the (b-2) component, one represented by the following general formulas (VII) and (VIII) can be preferably used.

$$([L^1\text{-}R^{26}]^{k+})_a([Z]^-)_b \quad (VII)$$

$$([L^2]^{k+})_a([Z]^-)_b \quad (VIII)$$

In the formula (VII), $L^1$ is a Lews acid base, $R^{26}$ is a hydrogen atom, an alkyl group having 1 to 20 carbon atoms or a hydrocarbon group having 6 to 20 carbon atoms selected from an aryl group, an alklyaryl group and an arylalkyl group.

Specific examples of $L^1$ include amines such as ammonia, methylamine, aniline, dimethylamine, diethylamine, N-methylaniline, diphenylamine, N,N-dimethylaniline, trimethylamine, triethylamine, tri-n-butylamine, methyldiphenylamine, pyridine, p-bromo-N,N-dimethylaniline, p-nitro-N,N-dimethylaniline; phosphines such as tiethylphosphine, triphenylphosphine and diphenylphosphine; thioethers such as tetrahydrothiophene; esters such as ethyl benzoate and nitriles such as acetonitrile and benzonitrile. Specific examples of $R^{26}$ include a hydrogen atom, a methyl group, an ethyl group, a benzyl group and a trityl group.

In the general formula (VIII), $L^2$ is $M^1$, $R^{27}R^{28}M^2$, $R^{29}$C or $R^{30}M^2$. $R^{27}$ and $R^{28}$ are independently a cyclopentadienyl group, a substituted cyclopentadienyl group, an indenyl group or a fluorenyl group. $R^{29}$ is an alkyl group having 1 to 20 carbon atoms or a hydrocarbon group having 6 to 20 carbon atoms selected from an aryl group, an alkylaryl group and an arylalkyl group. $R^{30}$ is a macrocyclic ligand such as tetraphenylporphine and phthalocyanine.

$M^1$ contains an element belonging to the $1^{st}$ to $3^{rd}$, $11^{th}$ to $13^{th}$ and $17^{th}$ group of the periodic table, and $M^2$ is an element belonging to the $7^{th}$ to $12^{th}$ group of the periodic table.

Here, specific examples of $R^{27}$ and $R^{28}$ include a cyclopentadienyl group, a methylcyclopentadienyl group, an ethylcyclopentadienyl group and a pentamethylcyclopentadienyl group. Specific examples of $R^{29}$ include a phenyl group, a p-tolyl group and a p-methoxy phenyl. Specific examples of $R^{30}$ include tetraphenylporphorin and phthalocyanine. Specific examples of $M^1$ include Li, Na, K, Ag, Cu, Br, I and $I_3$. Specific examples of $M^2$ include Mn, Fe, Co, Ni and Zn.

In the general formulas (VII) and (VIII), k is an integer of 1 to 3 and an ionic valency of $[L^1\text{-}R^{26}]$ or $[L^2]$, a is an integer of 1 or more and b=(k×a).

$[Z]^-$ is $[Z^1]^-$ or $[Z^2]^-$, which is a non-coordinating anion.

$[Z^1]^-$ is an anion in which a plurality of groups are bonded to an element, that is $[M^3G^1G^2\ldots G^f]$. Here, $M^3$ is an element belonging to the $5^{th}$ to $15^{th}$ group of the periodic table, preferably an element belonging to the $13^{th}$ to $15^{th}$ group of the periodic table. $G^1$ to $G^f$ are independently a hydrogen atom, a halogen atom, and a alkyl group having 1 to 20 carbon atoms, a dialkylamino group having 2 to 40 carbon atoms, an alkoxy group having 1 to 20 carbon atoms, an aryl group having 6 to 20 carbon atoms, an aryloxy group having 6 to 20 carbon atoms, an alkylaryl group having 7 to 40 carbon atoms, an arylalkyl group having 7 to 40 carbon atoms, a halogen-substituted hydrocarbon group having 1 to 20 carbon atoms, an acyloxy group having 1 to 20 carbon atoms, an organic metalloid group having 1 to 20 carbon atoms or a hetero atom-containing hydrocarbon group having 2 to 20 carbon atoms. Two or more of $G^1$ to $G^f$ may form a ring. f is an integer of [(atomic valence of the central metal $M^3$)+1].

$[Z^2]^-$ is Brønsted acid of which the logarithm (pKa) of the reciprocal of an acid dissociation constant is −10 or less, a conjugated base of Brønsted acid and Lewis acid, or a conjugate base of an acid which is generally defined as super strong acid. Further, a Lewis acid base may be coordinated.

Here, in $[Z^1]^-$, i.e. $[M^3G^1G^2\ldots G^f]^-$, specific examples of $M^3$ include B, Al, Si, P, As and Sb, with B and Al being preferably given. Specific examples of $G^1$ and $G^2$ to $G^f$ include, as the alkylamino group, a dimethylamino group and a diethylamino group; as the alkoxy group or the aryloxy group, a methoxy group, an ethoxy group, an n-propoxy group and a phenoxy group; as the hydrocarbon group, a methyl group, an ethyl group, n-propyl group, an isopropyl group, an n-butyl group, an isobutyl group, an n-octyl group, an n-eicosy group, a phenyl group, a p-tolyl group, a benzyl group, a 4-t-butyl phenyl group, a 3,5-dimethylphenyl group; as the halogen atom, fluorine, chlorine, bromine and iodine; as the hetero atom-containing hydrocarbon group, a p-fluorophenyl group, a 3,5-difluorophenyl group, a pentachloro phenyl group, a 3,4,5-trifluorophenyl group, a pentafluorophenyl group, 3,5-bis(trifluoromethyl)phenyl group, a bis (trimethylsilyl)methyl group; and as the organic metalloid group, a pentamethyl antimony group, a trimethylsilyl group, a trimethylgermyl group, a diphenylarsine group, a dicyclohexylantimony group and a diphenylboronic group.

As specific examples of the non-coordinating anion, i.e. $[Z^2]^-$, which is Brønsted acid of which the pKa is −10 or less or a conjugated base of Brønsted acid and Lewis acid, a trifluoromethanesulfonic acid anion $(CF_3SO_3)^-$, a bis(trifluoromethanesulfonyl)methyl anion, a bis(trifluoromethane-sulfonyl)benzyl anion, bis(trifluoromethanesulfonyl)amide, a perchloric acid anion (ClO$_4$)$^-$, a trifluoroacetate anion (CF$_3$COO)$^-$, a hexafluoroantimony anion (SbF$_6$)$^-$, a fluorosulfonic acid anion (FSO$_3$)$^-$, a chlorosulfonic acid anion (ClSO$_3$)$^-$, a fluorosulfonic acid anion/antimony pentafluoride (FSO$_3$/SbF$_5$)$^-$, a fluorosulfonic acid anion/arsenic pentafluoride (FSO$_3$/AsF$_5$)—, trifluoromethanesulfonic acid/antimony pentafluoride (CF$_3$SO$_3$/(SbF$_5$) can be given.

Specific examples of the component (b-2) include triethylammonium tetraphenylborate, tri-n-butylammonium tetraphenylborate, trimethylammonium tetraphenylborate, tetraethylammonium tetraphenylborate, (tri-n-butyl) ammonium tetraphenylborate, benzyl(tri-n-butyl) ammonium tetraphenylborate, dimethyldiphenylammonium tetraphenylborate, triphenyl(methyl)ammonium tetraphenylborate, trimethylanilinium tetraphenylborate, methylpyridium tetraphenylborate, benzylpyridinium tetraphenylborate, methyl(2-cyanopyridinium)tetraphenylborate, triethylammonium tetrakis(pentafluorophenyl)borate, tri-n-butylammonium tetrakis(pentafluorophenyl)borate, triphenylammonium tetrakis(pentafluorophenyl)borate, tetrakis-n-butylammonium tetrakis(pentafluorophenyl)borate, tetraethylammonium tetrakis(pentafluorophenyl)borate, benzyl(tri-n-butyl)ammonium tetrakis(pentafluorophenyl) borate, methyldiphenyl ammonium tetrakis(pentafluorophenyl)borate, triphenyl(methyl)ammonium tetrakis(pentafluorophenyl)borate, methylanilinium tetrakis(pentafluorophenyl)borate, dimethylanilinium tetrakis(pentafluorophenyl)borate, trimethylanilinium tetrakis(pentafluorophenyl)borate, methylpyridium tetrakis(pentafluorophenyl)borate, benzylpyridinium tetrakis(pentafluorophenyl)borate, methyl(2-cyanopyridinium) tetrakis(pentafluorophenyl)borate, benzyl(2-cyanopyridinium)tetrakis(pentafluorophenyl)borate, methyl(4-cyanopyridinium)tetrakis(pentafluorophenyl)borate, triphenylphosphonium tetrakis(pentafluorophenyl)borate, dimethylanilinium tetrakis[bis(3,5-ditriluforomethyl)phenyl]borate, ferrocenium tetraphenylborate, silver tetraphenylborate, trity tetraphenylborate, manganese tetraphenylporphine tetraphenylborate, ferrocenium tetrakis (pentafluorophenyl)borate, (1,1'-dimethylferrocenium) tetrakis(pentafluorophenyl)borate, decamethylferrocenium tetrakis(pentafluorophenyl)borate, silver tetrakis(pentafluorophenyl)borate, trityl tetrakis(pentafluorophenyl)borate, lithium tetrakis(pentafluorophenyl)borate, sodium tetrakis (pentafluorophenyl)borate, tetraphenylporphyrin manganese tetrakis(pentafluorophenyl)borate, silver tetrafluoroborate, silver hexfluorophosphate, silver hexfluoroarsenate, silver perchlorate, silver trifluoroacetate and silver trifluoromethanesulfonate.

This component (b-2) may be used singly or in combination of two or more. In the invention, if the component (B) is used, the amount ratio of the component (A) to the component (B) is as follows. That is, when the component (b-1) is used as the component (B), the amount ratio of the component (A) to the component (B) is 1:1 to 1:1,000,000, more preferably 1:10 to 1:10,000 in molar ratio. When the component (b-2) is used, the amount ratio of the component (A) to the component (B) is 10:1 to 1:100, more preferably 2:1 to 1:10. As the component (B), the component (b-1) and the component (b-2) or the like may be used singly or in combination of two or more.

The catalyst to be used in the invention may be one that contains the component (A) and the component (B) as the main components, or may be one that contains the component (A), the component (B) and the component (C) as the main components. Here, as the organic aluminum compound as the component (C), a compound represented by the general formula (IX) can be used.

$$(R^{31})_v AlQ_{3-v} \quad (IX)$$

wherein $R^{31}$ an alkyl group having 1 to 10 carbon atoms; Q is a hydrogen atom, an alkoxy group having 1 to 20 carbon atoms, an aryl group having 6 to 20 carbon atoms, or a halogen atom, and v is an integer of 1 to 3.

As specific examples of the compound represented by the general formula (IX), trimethylaluminum, triethylaluminum, triisopropylaluminum, triisobutylaluminum, dimethylaluminum chloride, diethylaluminum chloride, methylaluminum-dichloride, ethylaluminum dichloride, dimethylaluminum fluoride, diisobutylaluminum hydride, diethylaluminum hydride, ethylaluminum sesquichloride or the like can be given. These organic aluminum compounds may be used singly or in combination of two or more. The amount mole ratio of the component (A) to the component (C) are preferably 1:1 to 1:10,000, more preferably, 1:5 to 1:2,000, and further preferably 1:10 to 1:1,000. By using the component (C), it is possible to improve activity per transitional metal. However, a too large amount of the organic aluminum compound is not preferable, since it is used wastefully, and it remains in a large amount in an α-olefin polymer.

In the invention, no specific restrictions are imposed on the polymerization method, and any of the block polymerization method, the solution polymerization method, the suspension polymerization method, the slurry polymerization method and the vapor phase polymerization method can be used.

As for the polymerization conditions, the polymerization temperature is normally 0 to 200° C., preferably 30 to 150° C., and more preferably 40 to 120° C. As for the amount ratio of the catalyst relative to the raw material monomer, the raw material monomer/the component (A) (molar ratio) is preferably 1 to 10$^8$, and particularly preferably 100 to 10$^5$. Further, the polymerization time is normally 5 minutes to 20 hours, reaction pressure is preferably normal pressure to 0.2 MPaG, and particularly preferably from normal pressure to 0.1 MPaG.

In respect of cost effectiveness, it is preferred that polymerization be conducted in the absence of a solvent. However, it is possible to use a solvent. In this case, for example, an aromatic hydrocarbon such as benzene, toluene, xylene and ethyl benzene; a cycloaliphatic hydrocarbon, such as cyclopentane, cyclohexane and methyl cyclohexane; an aliphatic hydrocarbon such as such as pentane, hexane, heptane and octane; and halogenated hydrocarbon chloroform and dichloromethane. These solvents may be used singly or in combination or two or more. Further, a monomer such as 1-decene can be used as a solvent.

After the polymerization, in order to prevent excessive polymerization, a deactivator (catalyst deactivator) is added, thereby to deactivate the polymerization catalyst. If the viscosity of the polymerization reaction liquid is high, it is preferable to decrease the viscosity by adding a solvent before and after deactivation.

As the deactivator, alcohol, water and an aqueous solution of an acid, an alkali and an oxygen-containing compound can be given, for example. Specific examples thereof include an aqueous sodium hydroxide solution, ethanol, isopropyl alcohol, hydrochloric acid and acetone.

In the invention, the decalcified oil phase and water are mixed, and stirred at a stirring intensity of 0.1 kW/m$^3$ or more for 1 minute or more. The stirring intensity is 0.1 to 10 kW/m$^3$, preferably 0.1 to 5 kW/m$^3$, and further preferably 0.1 to 1 kW/m$^3$.

Before mixing with the washing liquid, the oil phase is mixed with an organic solvent such as 1-decene to adjust the liquid viscosity.

Stirring time is 2 minutes or longer, more preferably 3 minutes or longer, preferably 60 minutes or shorter, more preferably 30 minutes or shorter, with 10 minutes or shorter being further preferable.

If the stirring time (contact mixing time) is long, fine particles can be removed more effectively, leading to prolongation of the filter service life. On the other hand, a too long stirring time is not economical.

Washing may be conducted either continuously or batch-wise.

Washing is normally conducted in a stirring chamber. A stirring chamber is characterized in that, although the stirring intensity is weak (normal range of use: 0.1 to 1 kW/m$^3$), the holding time (stirring time) is long (normal: several to several ten minutes). A stirring chamber is normally formed of a vessel and a stirrer accommodated therein. A liquid to be stirred is put in the vessel, and stirring is conducted by rotating a stirrer at a certain speed.

Since fine particles in the oil phase can be effectively washed by using the stirring chamber, clogging of a filter can be significantly suppressed.

As long as a stirring chamber is used in a normal manner (stirring intensity: 0.1 to 1 kW/m$^3$), the average holding time is preferably 3 to 10 minutes. If the holding time is within this range, the maintenance cost of a stirring chamber and a filter can be reduced.

If special strong stirring is conducted (for example, stirring intensity is 5.0 kW/m$^3$), the stirring time is 1 minute or longer. If slightly stronger stirring than normal is conducted (for example, stirring intensity is 1.5 kW/m$^3$), the stirring time is 2 minutes or longer. If stirring is conducted at a normal intensity (for example, stirring intensity is 0.8 kW/m$^3$), the stirring time is 3 minutes or longer.

If the holding time is about several minutes to 1 hour, the stirring chamber having a practical size can be used and the stirring can be realized sufficiently.

In respect of cost, it is advantageous to use a continuous stirring chamber (continuous circulating stirring chamber). The preferable stirring intensity and the preferable stirring time are the same as those mentioned above. If the stirring time (holding time) in a continuous stirring chamber is long, it is possible to prolong the service life of a filter. However, in such a case, a large-sized stirring chamber is required.

A static mixer is occasionally used when performing stirring operation continuously. In the case of a static mixer, the stirring intensity (stirring power per unit volume) is generally large (normally: 50 to 500 kW/m$^3$) and the holding time is short (normally: 0.1 to 1 second). Therefore, the static mixer is difficult to satisfy the stirring conditions of the invention.

After the above-mentioned washing, the oil phase is separated and collected. The solid fine particles remained in the oil phase are removed by a filter or the like. A bag filter can be used as the filter. It is preferred that the bag filter to be used have a normal filtration rating of 5 μm or less, more preferably 3 μm or less, and particularly preferably 1 μm or less. Further, the bag filter to be used preferably has an absolute filtration rating of 15 μm or less, more preferably 10 μm or less and particularly preferably 5 μm or less. If the filtration rating is too large, precipitates cannot be captured sufficiently.

As for the normal filtration rating and the absolute filtration rating, the "absolute filtration rating" means that 99.9% or more of particles with an indicated diameter are captured, and the "normal filtration rating" means that 80% or more of particles with an indicated diameter are captured.

The material of the filter of the bag filter used is not particularly restricted, and a filter formed of nylon, a filter formed of polypropylene or the like may be used, for example. A filter formed of polypropylene is preferable.

In general, in respect of life or required power, it is preferred that a filter be treated at a low pressure loss. If pressure loss is high, a treatment cannot be conducted unless the filtration area is increased. If the filter of the bag filter is formed of polypropylene, in respect of the filter structure, a high filtration rating can be obtained with a low pressure loss. Accordingly, the power such as a pump can be decreased.

Normally, the amount of solid fine particles contained in the polymerization reaction liquid after decalcification is small, and it is difficult to quantitatively analyze directly. The content of solid fine particles contained in the polymerization reaction liquid can be evaluated in terms of filter clogging. Filter clogging can be evaluated by actually passing the polymerization reaction liquid through the filter and calculating based on the pressure difference, the linear velocity of the passed liquid, the liquid viscosity, the filtration area and the accumulated amount of the passed liquid.

According to the invention, by suppressing clogging of a filter, the service life of a filter can be prolonged. If the filter service life is long, the cost of a filter and the production cost including the cost incurred for exchange work can be suppressed. Further, a period during which a filter cannot be used for exchange work can be shortened.

The filter service life is a period of time from the start of using a filter to a point where the above-mentioned difference in pressure reaches the limit of permissible range and the desirable processing speed cannot be obtained.

Further, it is preferred that the temperature of the liquid when passing the filter be high. If the liquid temperature is high, the liquid viscosity is lowered, whereby pressure loss when the liquid is passed through the filter can be suppressed. By suppressing the pressure loss, the load imposed on the filter cloth of a filter can be suppressed, and as a result, an increase in efficiency of capturing solid fine particles or prolongation of the filter service life can be expected.

However, when the liquid temperature at the time of liquid passage is too high, light components which are contained in the polymerization reaction liquid may volatilize and as a result, the liquid may turn into a mixed stream of vapor and liquid, whereby the linear velocity may elevate and the pressure loss may increase. Moreover, a polymerization reaction product thermally may decompose, and as a result, the product quality may be deteriorated.

Therefore, the liquid temperature when the liquid is passed through the filter is preferably 40 to 100° C., more preferably 60 to 90° C. Therefore, it is preferred that washing be conducted by heating the washing liquid to 40 to 100° C.

The linear velocity and difference in pressure when liquid is passed through the filter vary according the material and structure of the filter. The conditions are selected such that solid fine particles can be removed sufficiently.

Further, in order to use the filter on the continuous operation mode, it is normally required that the removal ratio of the solid fine particles be 98.5% or more.

After removing solid fine particles remaining in the oil phase by means of a filter or the like, the polymerization reaction liquid is subject to distillation to distil the light components off, whereby an olefin polymer is obtained.

EXAMPLES

Synthesis Example 1

[Preparation of Catalyst]

Under atmosphere of nitrogen, in a stainless-made stirring chamber, 500 mmol of triisobutyl aluminum, 10 mmol of (1,1'-dimethylsilylene)(2,2'-dimethylsilylene)-bis(cyclopentadienyl)zirconium dichloride and 20 mmol of powdery N,N-dimethylanillium tetrakis(pentafluorophenyl)borate were dissolved per liter of toluene. Then, 0.1 l of octene was added, followed by stirring for 1 hour at room temperature to prepare a catalyst mixture liquid.

[Polymerization Reaction]

In a stainless-made stirring chamber having an internal volume of 15 m$^3$, a raw material monomer (4450 kg of 1-octene, 6660 kg of 1-dodecene) and 1.484 kg of triisobutyl aluminum were placed, and the temperature of the resulting mixture was elevated to 108° C. and 0.02 MPaG of hydrogen was introduced.

With stirring, 2.6 l of the above-prepared catalyst mixture liquid was introduced once in 30 minutes. After putting the catalyst mixture liquid 30 times, the resultant was stirred for further one hour to conduct a polymerization reaction.

The monomer conversion rate of this polymerization reaction liquid was 92% and the liquid viscosity at 40° C. was 53.5 mPa·s.

The conversion rate and the liquid viscosity were measured by the following method.

(1) Conversion Rate 0.05 g of a sample was dissolved in 5 ml of dichloromethane, and calculated by means of gas chromatography (GC).

(GC measurement conditions)

Column: HT-SIMDISTCB (5 m×0.53 mmϕ, film thickness: 0.17 μm)

Column temperature: 40° C. (0.1 min), and elevated at a rate of

20° C./min to 420° C., 420° C. (15 min)

Injection port (COC) temperature: Oven truck

Detector (FID): temperature: 440° C.

Carrier gas: He

Linear velocity: 40 cm/sec

Mode: Constant flow

Injection amount: 0.5 μl (2) Liquid Viscosity

Liquid viscosity was measured by means of a fork oscillating viscometer manufactured by A & D Company, Ltd.

[Deactivation, Decalcification (Alkali Washing) and Dilution]

In a stirring chamber, 2000 kg of a 1 wt % aqueous sodium hydroxide solution was added, followed by mixing by stirring for 1 hour. The resultant was allowed to stand for 1 hour to separate oil and water. From this stirring chamber, a decalcified oil phase (polymerization reaction liquid) was taken out.

Thereafter, 180 g of this decalcified oil phase and 180 g of 1-decene were mixed, and the liquid viscosity at 40° C. was adjusted to 2.8 mPa·s, whereby decalcified diluted oil was obtained.

Example 1

The decalcified diluted oil obtained in Synthesis Example 1 was charged in a batch-type stirring chamber provided with a jacket. While heating the jacket to 80° C. with hot water, pure water was added at an oil and water ratio (pure water/decalcified diluted oil) of 0.25 [vol/vol], followed by stirring for 30 minutes. The stirring intensity was 0.14 kW/m$^3$ (number of revolutions at the time of stirring: 300 rpm).

At this time, in the stirring chamber, W/O (Water in Oil) dispersion in which a water phase was dispersed in an oil phase was attained. It could be confirmed visually that most of the water phase (water droplets) was uniformly dispersed in the oil phase, and that the mixing was conducted sufficiently. The results are shown in Table 1.

After the stirring, the mixture was allowed to stand for 15 minutes. The oil phase was removed and passed through the filter cloth of a bag filter (ACCUGAF filter bag (model: AGF53) manufactured by Eaton Corporation).

Clogging of the filter was evaluated from pressure difference (ΔP) before and after the filter cloth, the liquid viscosity (μ), the linear velocity of the passed liquid (u), filtering area (A) and the accumulated amount of passed oil (V). The results are shown in FIG. 1.

Figure 1:
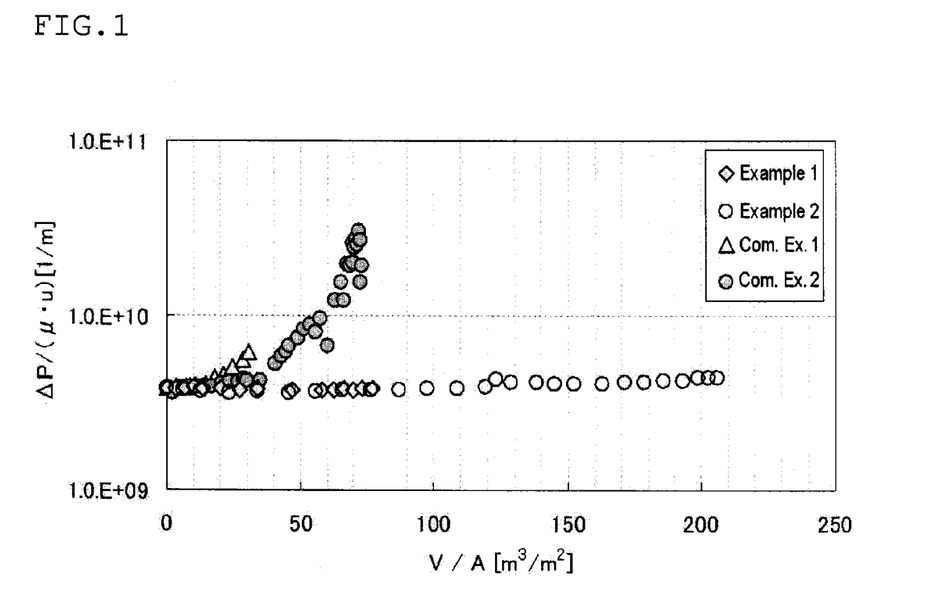
FIG. 1 is a view showing the evaluation results of clogging of a filter in Examples 1 and 2 and Comparative Examples 1 and 2.

In FIG. 1, the horizontal axis indicates the treated volume per unit area of the filter and the vertical axis indicates the coefficient (=filtration resistance) obtained by non-dimensionalization of the filter pressure difference with the viscosity and the linear velocity of the passed liquid. A larger value of the vertical axis indicates a larger degree of filter clogging. The same can be applied to FIG. 2.

Example 2

The decalcified diluted oil obtained in Synthesis Example 1 was placed in a batch-type stirring chamber provided with a jacket. While heating the jacket to 80° C. with hot water, pure water was added at an oil and water ratio (pure water/decalcified diluted oil) of 0.25 [vol/vol], followed by stirring for 4 minutes. The stirring intensity was 0.63 kW/m$^3$ (number of revolutions at the time of stirring: 500 rpm).

At this time, in the stirring chamber, W/O (Water in Oil) dispersion in which a water phase was dispersed in an oil phase was attained but, most of the water phases (water droplets) was deposited in the lower part of the oil phase and the mixing was not conducted sufficiently. The results are shown in Table 1.

After the stirring, filter clogging was evaluated in the same manner as in Example 1. The results are shown in FIG. 1.

Comparative Example 1

The decalcified diluted oil obtained in Synthesis Example 1 was placed in a batch-type stirring chamber provided with a jacket. While heating the jacket to 80° C. with hot water, pure water was added at an oil and water ratio (pure water/decalcified diluted oil) of 0.25 [vol/vol], followed by stirring for 30 minutes. The stirring intensity was 0.01 kW/m$^3$ (number of revolutions at the time of stirring: 200 rpm).

At this time, in the stirring chamber, W/O (Water in Oil) dispersion in which a water phase was dispersed in an oil phase was attained, but most of the water phase (water droplets) was uniformly dispersed in the oil phase, and that the mixing was conducted sufficiently. The results are shown in Table 1.

After the stirring, filter clogging was evaluated in the same manner as in Example 1. The results are shown in FIG. 1.

Comparative Example 2

The decalcified diluted oil obtained in Synthesis Example 1 was charged in a glass Schlenk bottle. While heating the outer wall at 80° C. by means of a tape heater, pure water was added at an oil and water ratio (pure water/decalcified diluted oil) of 0.25 [vol/vol], followed by stirring for 10 minutes by means of a magnetic stirrer. The stirring intensity was 0.04 kW/m$^3$ (number of revolutions at the time of stirring: 450 rpm).

At this time, in the stirring chamber, W/O dispersion in which a water phase was dispersed in an oil phase was attained. It could be confirmed visually that most of the water phase (water droplets) was deposited in the lower part of the oil phase, which meant that mixing could not be conducted sufficiently. The results are shown in Table 1.

After the stirring, filter clogging was evaluated in the same manner as in Example 1. The results are shown in FIG. 1.

Synthesis Example 2

[Polymerization Reaction]

In a stainless-made autoclave with an internal volume of 30 L, a raw material monomer (1-octene: 5.2 kg, 1-dodecene: 8.0 kg) and 9 mmol of triisobutyl aluminum (9 ml of a 1 mmol/ml toluene solution) was placed. The resultant was heated to 95° C., and 0.02 MPaG of hydrogen was introduced.

While introducing at a flow rate of 1.5 ml/min, the catalyst mixture liquid prepared in the same manner as in Synthesis Example 1 was stirred to conduct polymerization reaction. After inputting 5.4 l of the catalyst mixture liquid, the resultant was stirred for further 1 hour. The average temperature during the polymerization reaction was 108° C. and the monomer conversion rate of the polymerization reaction liquid was 90%.

[Dilution, Deactivation and Decalcification (Alkali Washing)]

In a stainless-made apparatus with an internal volume of 20 L, a stirrer, 5 kg of 1-decene and 2 kg of an aqueous 1 wt % of sodium hydroxide solution were charged. In the atmosphere of nitrogen, 5 kg of the above-obtained polymerization reaction liquid was transferred. After stirring the reaction mixture in the apparatus for 1 hour by means of the stirrer, the resultant was allowed to stand for 1 hour to separate oil and water. The oil phase was taken out from the stirring chamber. The oil phase had a liquid viscosity of 3.5 mPa·s at 40° C.

Comparative Example 3

The oil phase obtained in Synthesis Example 2 and pure water were passed through a static mixer (SM) (Model: 1/4-N40-172-0, manufactured by Noritake Co., Ltd.) at an oil and water ratio (pure water/decalcified diluted oil) of 0.25 [vol/vol] to conduct oil and water mixing. As shown in Table 1, the stirring time was 0.2 seconds and the stirring intensity was 280 kW/m³.

Figure 2:
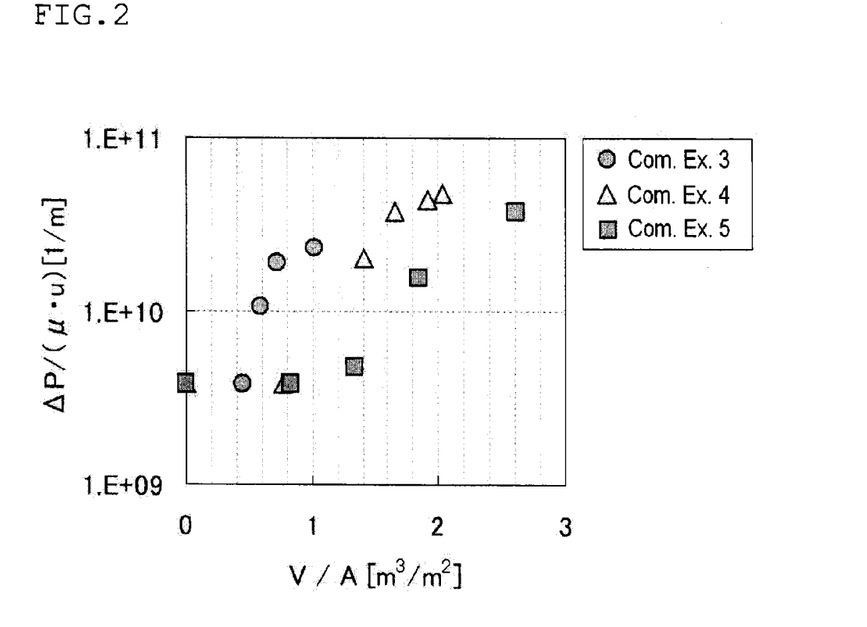
FIG. 2 is a view showing the evaluation results of clogging of a filter in Comparative Examples 3 to 5.

After the stirring, filter clogging was evaluated in the same manner as in Example 1. The results are shown in FIG. 2.

Comparative Example 4

In this comparative example, washing by means of SM was conducted twice. Specifically, after washing with water in Comparative Example 3, the oil phase and pure water were passed through the static mixer (Model: 1/4-N40-172-0, manufactured by Noritake Co., Ltd.) at an oil and water ratio (pure water/decalcified diluted oil) of 0.25 [vol/vol] to conduct oil and water mixing. As shown in Table 1, the stirring time was 0.2 seconds and the stirring intensity was 260 kW/m³.

After the stirring, filter clogging was evaluated in the same manner as in Example 1. The results are shown in FIG. 2.

Comparative Example 5

In this comparative example, washing by means of SM was conducted three times. Specifically, after washing with water in Comparative Example 4, the oil phase and pure water were passed through the static mixer (Model: 1/4-N40-172-0, manufactured by Noritake Co., Ltd.) at an oil and water ratio (pure water/decalcified diluted oil) of 0.25 [vol/vol] to conduct oil and water mixing. As shown in Table 1, the stirring time was 0.2 seconds and the stirring intensity was 240 kW/m³.

After the stirring, filter clogging was evaluated in the same manner as in Example 1. The results are shown in FIG. 2.

TABLE 1

|  | Example 1 | Example 2 | Com. Ex. 1 | Com. Ex. 2 |
| --- | --- | --- | --- | --- |
| Water washing method | Stirring chamber | Stirring chamber | Stirring chamber | Stirring chamber |
| Holding time [min] | 30 | 4 | 30 | 10 |
| Stirring intensity [kW/m³] | 0.14 | 0.63 | 0.01 | 0.04 |
| Mixing state (visual observation) | ○ | ○ | x | x |

|  | Com. Ex. 3 | Com. Ex. 4 | Com. Ex. 5 |
| --- | --- | --- | --- |
| Water washing method | SM | SM | SM |
| Holding time [sec] | 0.2 | 0.2 | 0.2 |
| Stirring intensity [kW/m³] | 280 | 260 | 240 |
| Mixing state (visual observation) | ○ | ○ | ○ |

Figure 3:
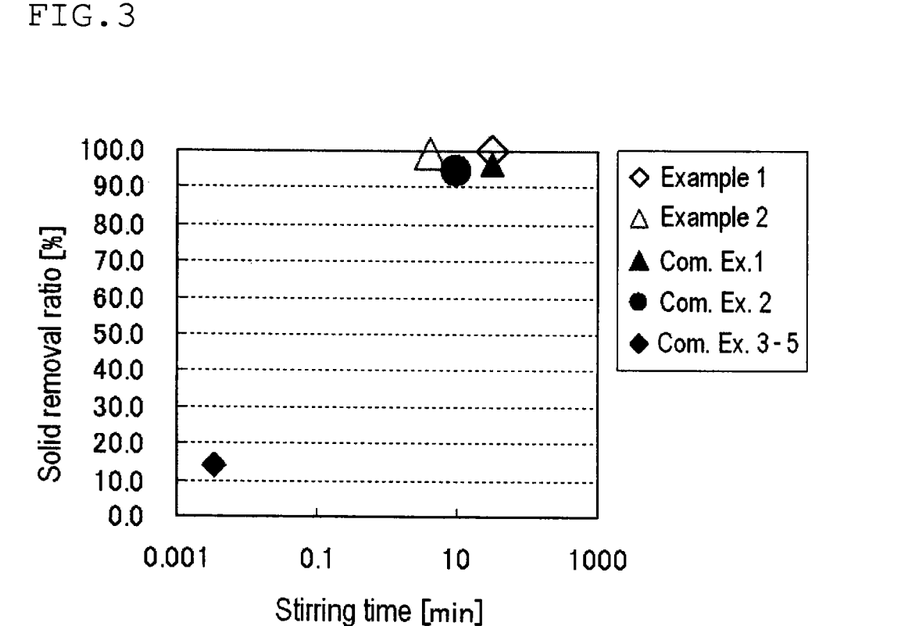
FIG. 3 is a view showing the solid fine particle removal ratio relative to stirring time in Examples and Comparative Examples.
Figure 4:
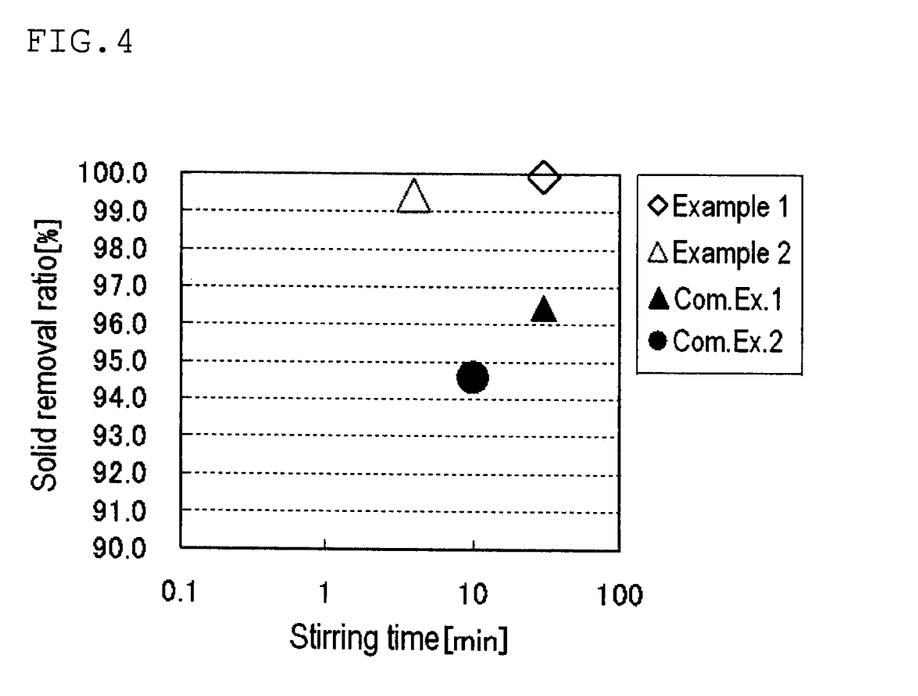
FIG. 4 is an enlarged view of FIG. 3.

The removal ratio of solid fine particles relative to the stirring time is shown in FIGS. 3 and 4. The solid fine particles removal ratio was obtained by counting backward from the treated amount which was the amount until the filter resistance became the same after passing the water-washed oil phase through a filter. FIG. 4 is an enlarged view of FIG. 3.

From FIGS. 3 and 4, it could be understood that the removal effect of solid fine particles by washing with water after decalcification varied depending on the stirring time.

INDUSTRIAL APPLICABILITY

The olefin polymer obtained by the production method of the invention can be used as a base material of lubricant oil.

Although only some exemplary embodiments and/or examples of this invention have been described in detail above, those skilled in the art will readily appreciate that many modifications are possible in the exemplary embodiments and/or examples without materially departing from the novel teachings and advantages of this invention. Accordingly, all such modifications are intended to be included within the scope of this invention.

The documents described in the specification and the specification of Japanese application(s) on the basis of which the present application claims Paris convention priority are incorporated herein by reference in its entirety.

The invention claimed is:

1. A method for producing an olefin polymer, comprising:

polymerizing an α-olefin having 6 to 20 carbon atoms in the presence of a metallocene catalyst of formula (III):

(III)

wherein
R¹ to R⁶ are independently a hydrogen atom, a halogen atom, a hydrocarbon group having 1 to 20 carbon atom or an organic group having 1 to 20 carbon atoms which contains one or more atoms selected from a halo gen atom, a silicon atom, an oxygen atom, a sulfur atom, a nitrogen atom and a phosphor atom; at least one selected from R¹ to R³ is a hydrogen atom, and at least one selected from R⁴ to R⁶ is a hydrogen atom;

$R^a$ and $R^b$ are independently a bonding group represented by the following formula (a)

(a)

wherein n is an integer of 1 to 3; $R^7$ and $R^8$ are independently a hydrogen atom, a halogen atom, a hydrocarbon group having 1 to 20 carbon atoms or a halogen-containing hydrocarbon group having 1 to 20 carbon atoms; and B is an atom belonging to the 14$^{th}$ group of the periodic table;

$X^1$ and $X^2$ are independently a hydrogen atom, a halogen atom, a hydrocarbon group having 1 to 20 carbon atoms or an organic group having 1 to 20 carbon atoms containing one or more atoms selected from a halogen atom, a silicon atom, an oxygen atom, a sulfur atom, a nitrogen atom and a phosphor atom; and M is a transitional metal belonging to the 4$^{th}$ to 6$^{th}$ group of the periodic table; To obtain an olefin polymer in a polymerization reaction liquid;

deactivating and removing the catalyst from the polymerization reaction liquid by adding thereto a deactivator selected from alcohol, water, an aqueous solution of an acid, an aqueous solution of an alkali and an aqueous solution of an oxygen-containing compound followed by separating to obtain a purified polymerization reaction liquid comprising the olefin polymer; mixing the purified polymerization reaction liquid comprising the olefin polymer with water to provide a mixture;

washing the purified polymerization reaction liquid comprising the olefin polymer by stirring said mixture at a stirring intensity of 0.1 kW/m³ or more for 1 minute or longer to provide a washed and purified polymerization reaction liquid comprising the olefin polymer, and filtering the washing and purified polymerization reaction liquid comprising the olefin polymer.

2. The method according to claim 1, wherein the mixing with water takes presence in a continuous flow stirring chamber.

3. The method according to claim 1, wherein the metallocene catalyst of formula (III) is at least one member selected from the group consisting of (1,1'-ethylene)(2,2'-ethylene)biscyclopentadienylzirconium dichloride, (1,1'-ethylene)(2,2'-ethylene)bis(3-methylcyclopentadienyl)zirconium dichloride, (1,1'-ethylene)(2,2'-ethylene)bis(4-methylcyclopentadienyOzirconium dichloride, (1,1'-ethylene)(2,2'-ethylene)bis(3,4-dimethylcyclopentadienyl)zirconium dichloride, (1,1'-ethylene)(2,2'-ethylene)bis(3,5-dimethylcyclopentadienyl)zirconium dichloride, (1,1'-dimethylsilylene)(2,2'-dimethylsilylene)biscyclopentadienylzirconium dichloride, (1,1'-dimethylsilylene)(2,2'-dimethylsilylene)bis(3-methylcyclopentadienyl)zirconium dichloride,(1,1'-dimeth ylsilylene)(2,2'-dimethylsilylene)bis(4-methylcyclopentalienyl) zirconium dichloride, (1,1'-dimethylsilylene)(2,2'-dimethylsilylene)bis(3,4-dimethylcyclopentadienyl) zirconium dichloride, (1,1'-dimethylsilylene)(2,2'-dimethylsilylene) bis(3,5-dimethylcyclopentadienyl) zirconium dichloride, (1,1'-dimethylsilylene)(2,2'-ethylene)biscyclopentadienylzirconium dichloride, (1,1'-dimethylsilylene)(2,2'-ethylene)bis(3-methylcyclopentadienyOzirconium dichloride, (1,1'-dimethylsilylene)(2,2'-ethylene)bis(4-methylcyclopentadienyl)zirconium dichloride, (1,1'-dimethylsilylene)(2,2'-ethylene)bis(3,4-dimethylcyclopentadienyOzirconium dichloride, (1,1'-dimethylsilylene)(2,2'-ethylene)bis(3,5-dimethylcyclopentadienyl)zirconium dichloride, (1,1'-isopropylidene)(2,2'-dimethylsilylene) biscyclopentadienylzirconium dichloride, (1,1'-isopropylidene)(2,2'-dimethylsilylene)bis(3-methylcyclopentadienyl)zirconium dichloride, (1,1'-isopropylidene)(2,2'-dimethylsilylene)bis(4-methylcyclopentadienyl)zirconium dichloride, (1,1'-isopropylidene)(2,2'-dimethylsilylene)bis (3,4-dimethylcyclopentadienyl)zirconium chloride, (1,1'-isopropylidene)(2,2'-dimethylsilylene)bis(3,5-dirnethylcyclopentadienyl)zirconium dichloride, (1,1'-isopropylidene) (2,2'-isopropylidene)bis(3-methylcyclopentadienyl) zirconium dichloride, (1,1'-isopropylidene)(2,2'-isopropylidene)bis(4-methylcyclopentadienyl)zirconium dichloride, (1,1'-isopropylidene)(2,2'-isopropylidene) bis(3, 4-dimethylcyclopentadienyl)zirconium dichloride, (1,1'-isopropylidene)(2,2'-isopropylidene)bis(3,5-dimethylcyclopentadienyl)zirconium dichloride, dimethyl compounds thereof, diethyl compounds thereof, dihydro compounds thereof, diphenyl compounds thereof, dibenzyl compounds thereof, titanium complexes thereof and hafnium complexes thereof.

4. The method according to claim 1, wherein the metallocene catalyst of formula (III) is at least one member selected from the group consisting of (1,1'-dimethylsilylene)(2,2'-dimethylsilylene)biscyclopentadienylzirconium dichloride, (1,1'-dimethylsilylene)(2,2'-dimethylsilylene)bis(3-methylcyclopentadienyl)zirconium dichloride,(1,1'-dimethylsilylene)(2,2'-dimethylsilylene)bis(4-methylcyclopentadienyl)zirconium dichloride, (1,1'-dimethylsilylene)(2,2'-dimethylsilylene)bis(3,4-dimethylcyclopentadienyl) zirconium dichloride, (1,1'-dimethylsilylene)(2,2'-dimethylsilylene) and bis(3,5-dimethylcyclopentadienyl) zirconium dichloride.

5. The method according to claim 1, comprising washing the purified polymerization reaction liquid comprising the olefin polymer by stirring said mixture at a stirring intensity of 0.1 to 10 kW/m³ for 1 minute or longer to 60 minutes or shorter to provide the washed and purified polymerization reaction liquid comprising the olefin polymer.

6. The method according to claim 1, comprising washing the purified polymerization reaction liquid comprising the olefin polymer by stirring said mixture at a stirring intensity of 0.1 to 1 $kW/m^3$ for 1 minute or longer to 10 minutes or shorter to provide the washed and purified polymerization reaction liquid comprising the olefin polymer.

7. The method according to claim 1, comprising deactivating and removing the catalyst from the polymerization reaction liquid by adding thereto a deactivator selected from an aqueous sodium hydroxide solution, ethanol, isopropyl alcohol, hydrochloric acid and acetone followed by separating to obtain the purified polymerization reaction liquid comprising the olefin polymer.

* * * * *